United States Patent [19]

Chang et al.

[11] Patent Number: 5,542,040
[45] Date of Patent: Jul. 30, 1996

[54] DISPLAY OF DYNAMIC DATA AS A NOTEBOOK

[75] Inventors: David Y. Chang; Shih-Gong Li, both of Austin, Tex.

[73] Assignee: International Business Machines Corporation, Armonk, N.Y.

[21] Appl. No.: 169,921

[22] Filed: Dec. 15, 1993

[51] Int. Cl.$^6$ ...................................................... G06F 3/14
[52] U.S. Cl. .......................... 395/155; 395/157; 395/161
[58] Field of Search ..................................... 395/155, 157, 395/161, 159; 345/98; 364/419.17, 419.13

[56] References Cited

U.S. PATENT DOCUMENTS

| | | | |
|---|---|---|---|
| 4,974,173 | 11/1990 | Stefik et al. | 395/153 |
| 5,032,978 | 7/1991 | Watson et al. | 364/188 |
| 5,049,873 | 9/1991 | Robins et al. | 340/825.06 |
| 5,065,347 | 11/1991 | Pajak et al. | 395/159 |
| 5,202,828 | 4/1993 | Vertelney et al. | 395/159 |
| 5,220,649 | 6/1993 | Forcier | 395/155 |
| 5,231,698 | 7/1993 | Forcier | 395/155 |
| 5,341,293 | 8/1994 | Vertelney et al. | 364/419.17 |
| 5,367,624 | 11/1994 | Cooper | 395/157 |

*Primary Examiner*—Mark R. Powell
*Assistant Examiner*—Ruay Lian Ho
*Attorney, Agent, or Firm*—Jeffrey S. LaBaw

[57] ABSTRACT

A method, system and program for presenting dynamic data on a display. The dynamic data is displayed in a notebook as a plurality of groups, each group assigned to a page in the notebook. The dynamic data is monitored to detect a change in state of the dynamic data. In response to a detected change, a determination is made that the dynamic data should be regrouped in response to the change in state. The notebook is then displayed according to the regrouped dynamic data. Each page in the notebook has a tab which is displayed according to the state of the group assigned to that page. In response to the detected change of the dynamic data, the display of the tab may also be changed. Typically, the top page in a notebook has a window. A child window can be created by copying the window outside the notebook in an adjacent display. When the notebook is closed in response to a user command, the child window is automatically closed in response to closing the notebook.

29 Claims, 14 Drawing Sheets

DISPLAY OF DYNAMIC DATA AS A NOTEBOOK

BACKGROUND OF THE INVENTION

This invention relates generally to a user interface of a data processing system. More particularly, the invention concerns displaying dynamic data in the form of a notebook.

It is well known to provide a Graphical User Interface (GUI) to allow user to control computer system and to present their results of system operations on the display. In a graphical user interface, applications and data files are generally represented by a plurality of graphical objects such as windows or icons. When there is a large amount of data, particularly dynamic data such as status information which constantly changes, it is difficult to present all of the data simultaneously on the display. For this reason, the data may have to be displayed on many windows sequentially. For example, in the design and operation of computer networks, it is known to segment networks for various reasons and to present network information based on this segmentation. Devices or "nodes" on a network may be assigned to groups, or "clusters", according to traffic patterns so that the nodes within a cluster communicate more directly with each other than with other nodes. Nodes may also be assigned to groups according to differences in the transmission media between nodes, the location of the nodes or for security purposes. For manageability and readability, the group size should not grow too large. Thus, it is likely in large networks to have a large number of groups associated with dynamic data such as status information which must be accessible to the user by means of graphical user interface.

It is known to change the appearance of a symbol on a computer display to alert a user to the status of the system when a certain condition occurs. The volume or rate of network transactions among a group of nodes may be monitored in this manner. When the volume or rate of transactions within a cluster exceeds a preset limit, a symbol representing that group will alert the user to investigate the condition. However, this approach allows only a limited amount of information to be conveyed to the user to help in an investigation of the system. For example, with the usual system when a symbol announces that the volume of transactions has exceeded a limit within a cluster, the user must take steps to get more data about that cluster. Usually, this involves selecting the symbol that represents the cluster demanding attention and changing the computer display to show details. Navigation through several windows may be required. With large amounts of data, all the symbols can not be displayed simultaneously so the user may not be alerted.

the need to provide a manageable GUI for large amounts of dynamic data such as network status information is increasing. There is a trend toward larger, more complex networks because of distributed processing and parallel processing. Also, since individual network devices are becoming more powerful and less expensive, users tend to add to and reconfigure networks more frequently. Under these circumstances, it is more important, but harder to monitor the status of computer networks.

Other examples where a large amount dynamic data may be presented in a graphical user interface include stock commodity prices which change constantly to the market fluctuations and scientific monitoring of a experiment in process, for example, a space shuttle launch.

A notebook is a graphical control which has been incorporated in IBM's OS/2 Operating System which allows a substantial amount of information to be represented concisely in the GUI. A notebook is typically presented as a set of windows in which only the top window is visible. A series of tabs extend out from the other panel pages. However, a notebook does not typically present dynamic data, but static data. Further, the notebook has a number of limitations which make it difficult to monitor dynamic data such as network status. In today's notebook, an invariant set of data is associated with each page. There is no means to present data sets which are constantly reconfigured. Even if a notebook were adapted to display dynamic data, unless the user is looking at a particular page in which the status information is presented in the top page, there is no means of alerting the user that a change in state has occurred. Changes in state in the groups associated with the hidden pages are not visible.

There is occasionally a need to compare different groups of dynamic data. Logically, each page of the notebook would represent a group of the data. With a notebook, only a single page is visible at a time. Thus, when comparing different groups, the single page of the notebook is not informative enough. The user is forced to tab back and forth between the two pages. The designer might be prompted to put more information onto a page which will reduce the total number of pages, however, this defeats the original purpose of using a notebook, which is to classify data into groups and to present each group in a page. While these problems are to an extent shared with notebooks presenting static data, they are exacerbated when dynamic information is presented as the user cannot depend on the data which was presented on first page remaining constant at a later time when a second page is viewed.

The current construction of notebook dynamic link libraries (DLLs) are not designed to provide support for dynamic information. Nor are they designed for viewing more than a single page at a time. Once the developer has written the notebook DLL, it will not support regrouping of the data in the notebook as may be required for certain applications.

SUMMARY OF THE INVENTION

Therefore, it is an object of the invention to present dynamic data in a manageable form, while allowing full accessibility to the data.

It is another object of the invention to present status information as the dynamic data.

It is another object of the invention to regroup the dynamic data according to changes in state of the data.

It is another object of the invention to summarize the state of a group of dynamic data and allow access to detailed information about any specific group of dynamic data.

It is another object of the invention to present to groups of dynamic data on the display simultaneously.

Another object of the invention is to monitor the status of nodes connected to a computer network.

These objects and others are accomplished by a method, system and program for presenting dynamic data on a display. The dynamic data is displayed in a notebook as a plurality of groups, each group assigned to a page in the notebook. In one preferred embodiment, the dynamic data is monitored to detect a change in state of the dynamic data. In response to a detected change, a determination is made that the dynamic data should be regrouped in response to the change in state. The notebook is then displayed according to the regrouped dynamic data. Each page of the notebook is presented according to an attribute type and a presentation type. The invention has particular application with large amounts of dynamic data are presented such as the status of a group of nodes in a computer system.

In a second embodiment of the invention, the top page in the notebook has a window displayed within. A child window can be created by copying the window outside the notebook in an adjacent display by means of a drag and drop operation. When the notebook is closed in response to a user command, the child window is automatically closed in response to closing the notebook.

In a third embodiment of the invention, each page in the notebook has a tab which is displayed according to the state of the group assigned to that page. In response to detecting a change in state for one of the groups of dynamic data, the display of the tab corresponding to that group is changed according to the change of state.

BRIEF DESCRIPTION OF THE DRAWINGS

This invention will become more easily understood by the following detailed description of a preferred embodiment of the invention with reference to the attached drawings, in which.

DETAILED DESCRIPTION OF THE DRAWINGS

The invention may be run on a collection of computers under a number of different operating systems. The computers in the network could be, for example, a personal computer, a mini computer, mainframe computer or a computer running in a distributed network of other computers. Although the specific choice of computer is limited only by disk and disk storage requirements, computers in the IBM PS/2 (TM) series of computers could be used in the present invention. For additional information on IBM's PS/2 series of computers, the reader is referred to *Technical Reference Manual Personal* Systems/2 Model 50, 60 systems IBM Corporation, Part No. 68X2224 Order Number S68X-2224 and *Technical Reference Manual Personal Systems/2 (Model* 80) *IBM Corporation* Part No. 68X 2256 Order Number S68X-2254. One operating system which an IBM PS/2 personal computer may run is IBM's OS/2 2.0 (TM). For more information the IBM OS/2 2.0 Operating System, the reader is referred to *OS/2 2.0 Technical Library, Programming Guide Vol.* 1, 2, 3 *Version* 2.00 Order Nos. 10G6261, 10G6495, 10G6494.

In the alternative, the computer system might be in the IBM RISC System/6000 (TM) line of computers which run on the AIX (TM) operating system. The various models of the RISC System/6000 are described in many publications of the IBM Corporation, for example, *RISC System/6000, 7073 and 7016 POWERstation and POWERserver Hardware Technical* reference, Order No. SA23-2644-00. The AIX operating system is described in *General Concepts and Procedure-AIX Version* 3 *for RISC System/*6000 Order No. SC23-2202-00 as well as other publications of the IBM Corporation.

Figure 1:
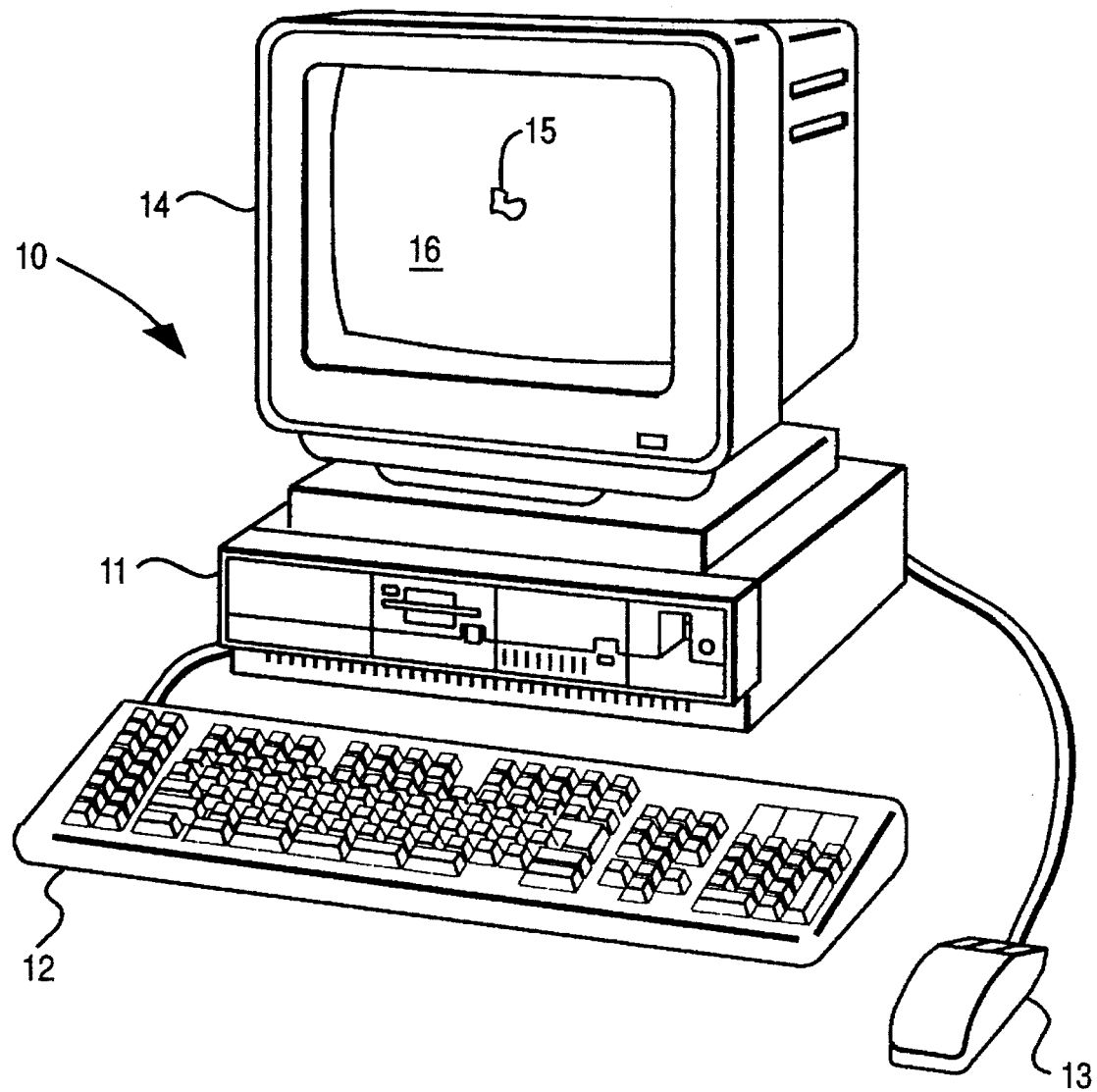
FIG. 1 illustrates a computer comprising a system unit, a keyboard, a mouse and a display.

In FIG. 1, a computer 10, comprising a system unit 11, a keyboard 12, a mouse 13 and a display 14 are depicted. The screen 16 of display device 14 is used to present the graphical user interface (GUI). The graphical user interface supported by the operating system allows the user to use a point and shoot method of input, i.e., by moving the mouse pointer 15 to an icon representing a data object at a particular location on the screen 16 and pressing one of the mouse buttons to perform a user command or selection.

Figure 2:
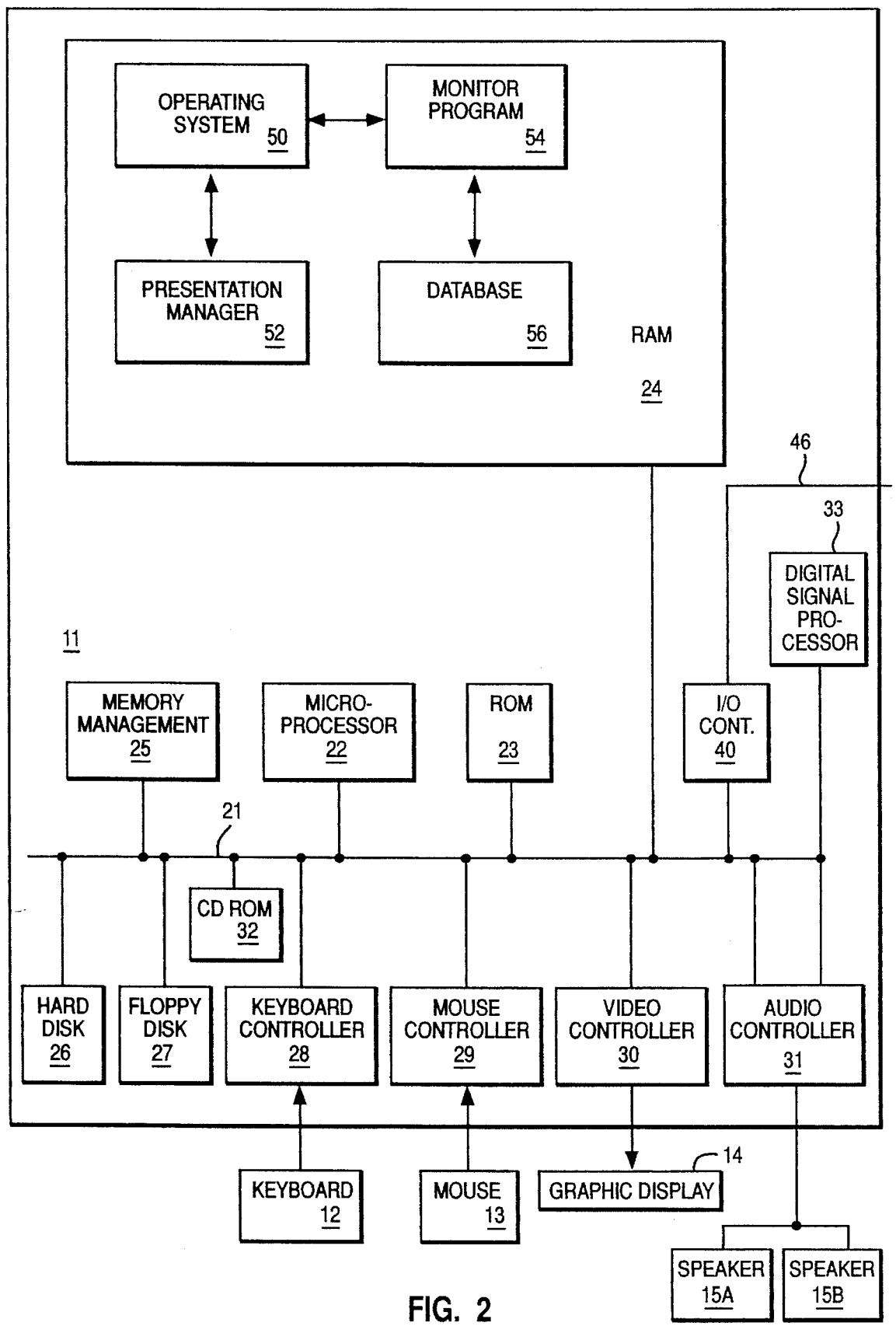
FIG. 2 is an architectural block diagram of the computer illustrated in FIG. 1.

FIG. 2 shows a block diagram of the components of the personal computer shown in FIG. 1. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM multimedia PS/2 series of computers is one of the Intel family of microprocessors including the 386 or 486 microprocessors. However, other microprocessors including, but not limited to, Motorola's family of microprocessors such as the 68000, 68020 or the 68030 microprocessors and various Reduced Instruction Set Computer (RISC) microprocessors manufactured by IBM, Hewlett Packard, Sun, Intel, Motorola and others may be used in the specific computer.

The ROM 23 contains among other code the Basic Input-Output system (BIOS) which controls basic hardware operations such as the interaction and the disk drives and the keyboard. The RAM 24 is the main memory into which the operating system and application programs are loaded. THE memory management chip 25 is connected to the system bus 21 and controls direct memory access operations including, passing data between the RAM 24 and hard disk drive 26 and floppy disk drive 27. The CD ROM 32, also coupled to the system bus 21, is used to store a large amount of data, e.g., a multimedia program or large database.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15a and 15b. The speakers 15a and 15b may be used to present audio objects to the user. An I/O controller 40 such as a Token Ring Adapter enables communication over a network 46 to other similarly configured data processing systems.

One of the preferred implementations of the present invention is as a set of instructions in a code module resident in the random access memory 24. Until required by the computer system, the set of instructions may be stored in another computer memory, for example, in the hard disk drive 26, in an optical disk for eventual use in the CD ROM 32 or in a floppy disk for eventual use in the floppy disk drive 27. As shown in the figure, the operating system 50 and presentation manager 52 are resident in RAM 24. In this example, the invention is embodied as an adjunct module onto the operating system. Alternatively, the graphical user interface could be incorporated into a standalone application 54, e.g., a monitor program. The monitor program 54 may monitor all the nodes in the network or only the subset of nodes which are part of the parallel database 56.

Figure 3:
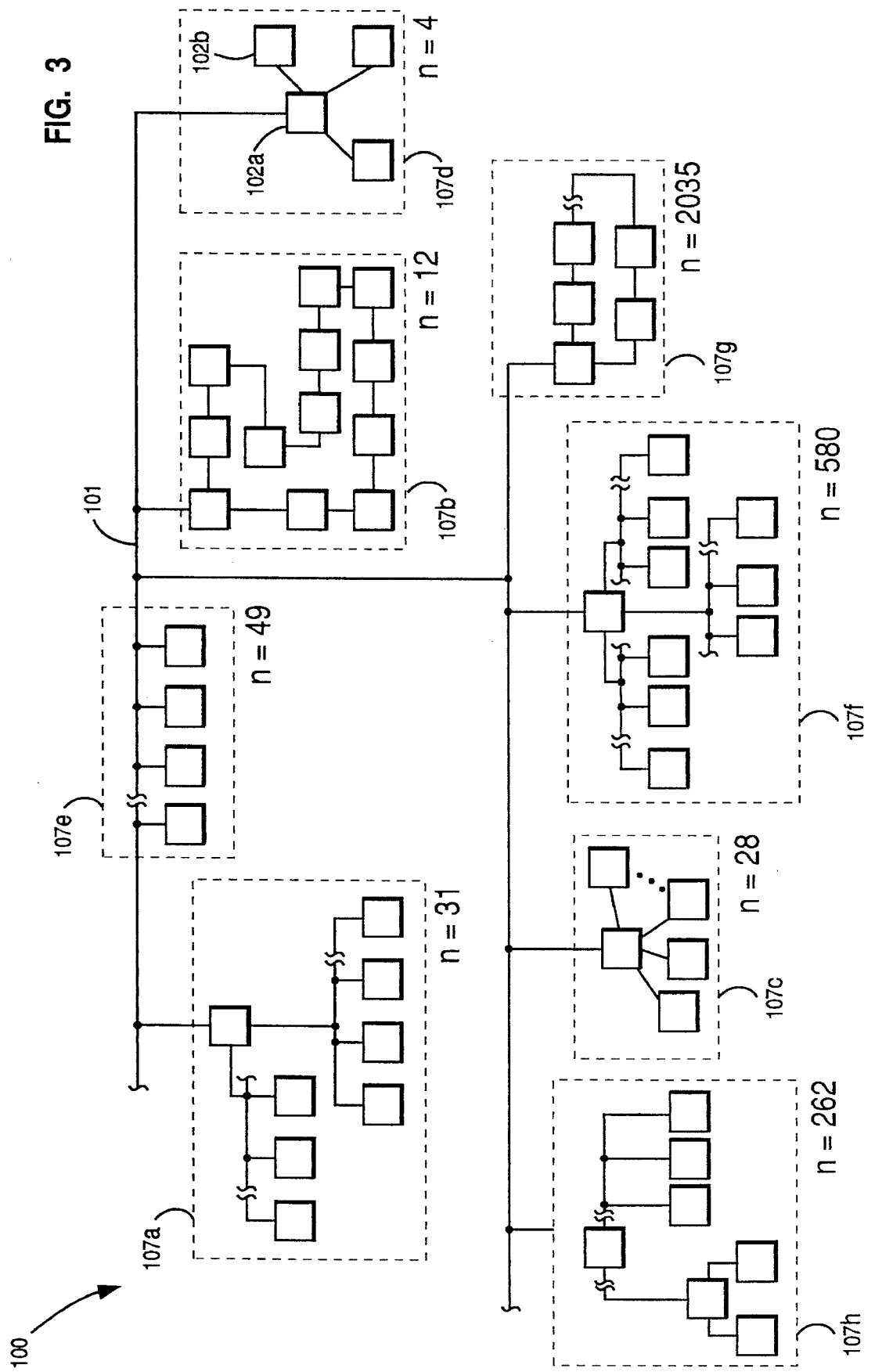
FIG. 3 illustrates a computer network having nodes in groups of various sizes.

In FIG. 3, a computer network is shown with a variety of nodes. The network 100 has a transmission medium 101 over which a variety of devices may communicate. Nodes 102a, 102b, etc. may include devices such as work stations 103, file servers 104, cell controllers 105, bridges 106, etc., all of which may be connected to the network 100 in groups of various sizes.

In the network depicted in the figure, the nodes have been assigned to eight groups 107a through 107h. According to the terminology of the present invention, the size of a group is defined as the number of nodes, n, in the group. In this example, the groups are of widely varying sizes as may be seen in the illustration.

Figure 4:
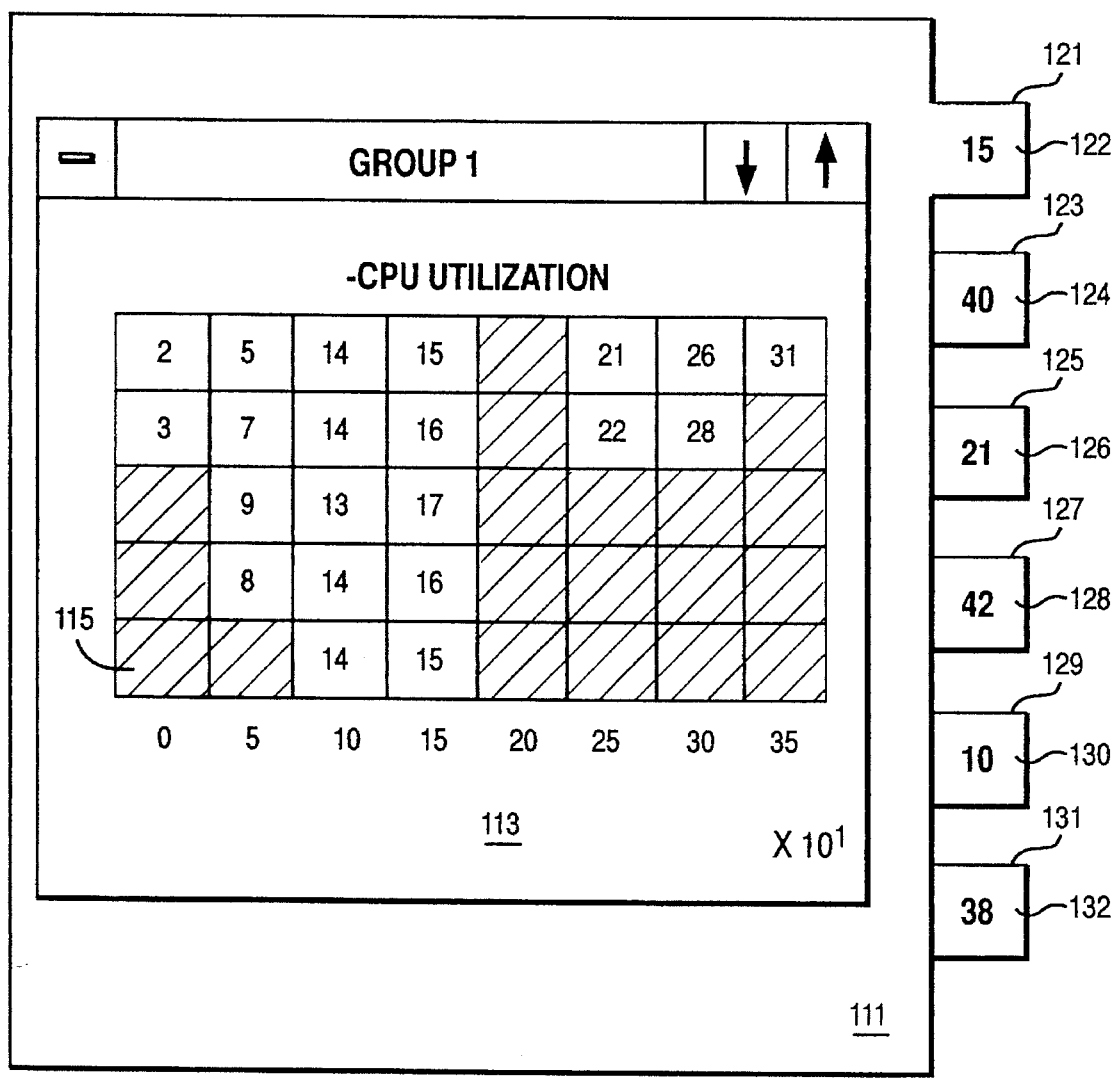
FIG. 4 illustrates a notebook of the present invention monitoring the network of FIG. 3.

Currently, the IBM OS/2 Operating System Version 2.1, provides a control device called a "notebook" which is useful when multiple panels or pages of data are displayed for review. As shown in FIG. 4, a notebook 110, according to the present invention, depicts a plurality of groups of dynamic data such as status information on the network depicted in FIG. 4. Top page 111 contains a window 113 which in turn contains a matrix 115 which is a two dimensional table depicting the CPU utilization for group 1, a set of nodes in the computer network. Each cell in the matrix represents one node. The first column represents nodes 0–4, the second column nodes 5–9, the third column 10–14, etc. The number within the cell represents the percent of CPU utilization. The cross hatched cells represent nodes in the network but are not monitored as they are not part of the parallel database. At a glance, the user can understand the higher numbered nodes also happen to have higher percentage CPU utilization in the process, potentially giving an indication that the load is not balanced equally through the nodes in group one. Cross hatching indicates nodes that are in the network, but are not in the parallel database so the monitor program does not monitor their activities. Tab area 121, protrudes from the page 111 and contains information which summarizes the state of the data associated with that page. Other tabs 123, 125, 127, 129, 131 are associated with other pages hidden beneath the top page 111. The plurality of tabs provide the user a means to leap to another page, i.e. another group, by moving the mouse pointer to the tab and selecting it. Each of these tabs 123, 125, 127, 129, 131 has a symbol or alphanumeric information 124, 126, 128, 130, 132 which depicts the status of the dynamic data contained on that page.

Tabs can be presented with symbols, colors to represent the different means, a tab for example, could have a bright red fire symbol indicating there is a high alert associated with a particular group of nodes. The tab could blink to attract the user'attention in the case of an alert condition, or alternatively, the icon on the page could change to reflect the state of the nodes or dynamic data on the page. As will be discussed later, the presentation of information in the window 113 can be specified as to a presentation type, such as matrix, bar chart or pie chart, and an attribute type which describes the type of data to be included in the presentation.

Figure 5A:
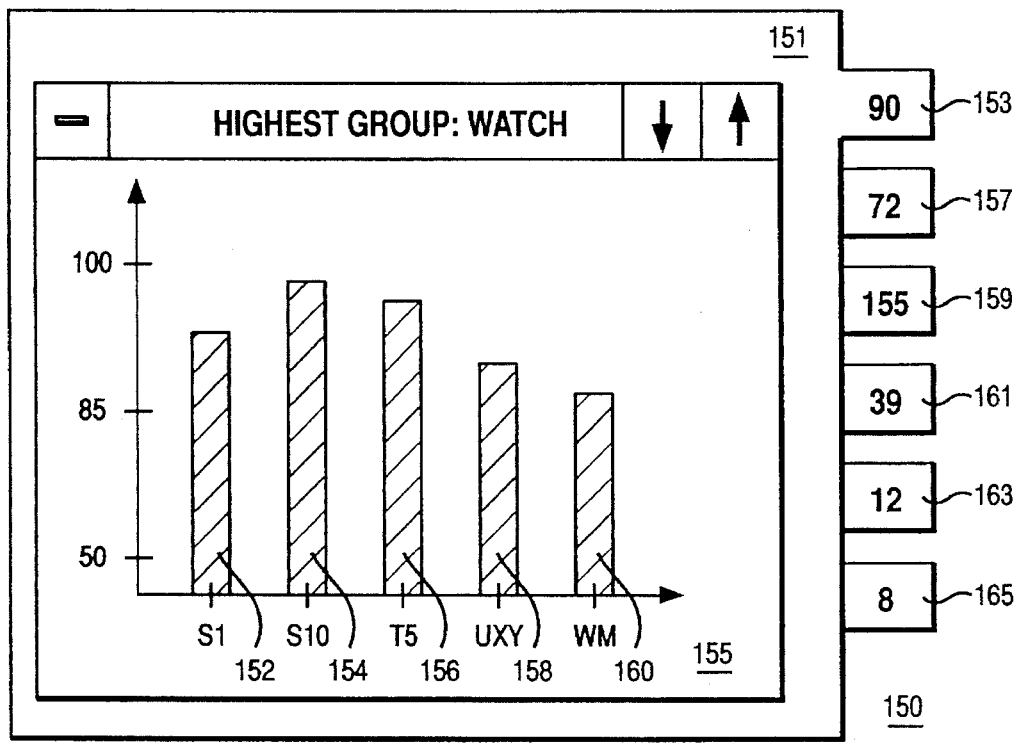
FIGS. 5A and 5B illustrate the notebook of the present invention where a state change has caused the regrouping of the nodes in the network.
Figure 5B:
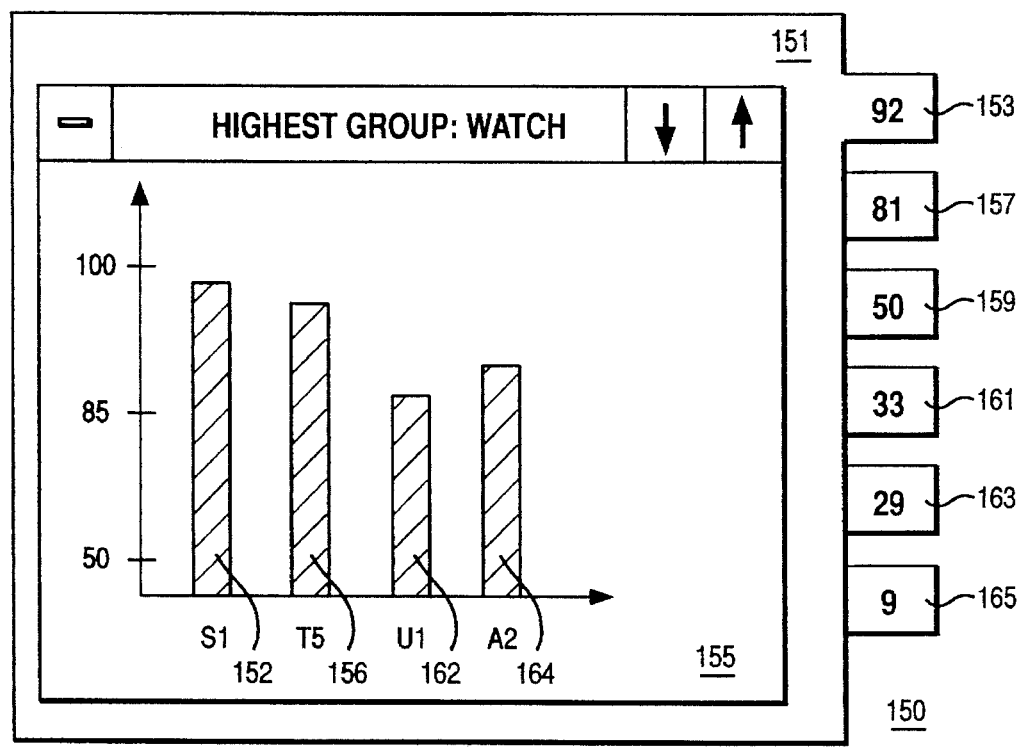

FIGS. 5A and 5B, illustrate the notebook of the present invention where a state change has caused the regrouping of the nodes in the network. In these figures, the grouping criteria is according to CPU utilization in group 1 CPU utilization is from 0–10 percent, in group 2 the utilization is from 10–30 percent, in group 3 the CPU utilization is from 30–50 percent, group 4 50–75 percent CPU utilization, group 5, 75–85 percent CPU utilization and group 6, the highest group, 85 to 100% utilization. The tab display is set to an average of the CPU utilization within the group. As shown in FIG. 5A, the top page 151 depicts group six, which has the highest utilization. The tab 153 shows an average utilization of 90%. The window 155 displays each node as a line bar 152, 154, 156, 158 and 160, which shows the percent utilization for that particular node. Also shown in the figure are tabs 157, 159, 161, 163 and 165 for groups 1–5 showing their average CPU utilization.

As shown in FIG. 5B, the relative of the CPU utilization of the various nodes has changed the therefore the dynamic data on the pages of the notebook has been regrouped. Nodes S10, UXY and WM dropped out of the highest utilization group and nodes U1 and A2 to enter the highest group. Thus, when the window 155 is refreshed on the notebook page 151, not only does it display line bars 152, 156 for nodes S1 and MT5, it also displays the new line bars, 162 and 164 for new nodes U1 and A2. Note also, that the tabs 153, 157, 159, 161, 163, 165 also reflect the changed CPU utilization for each group of nodes.

Figure 6A:
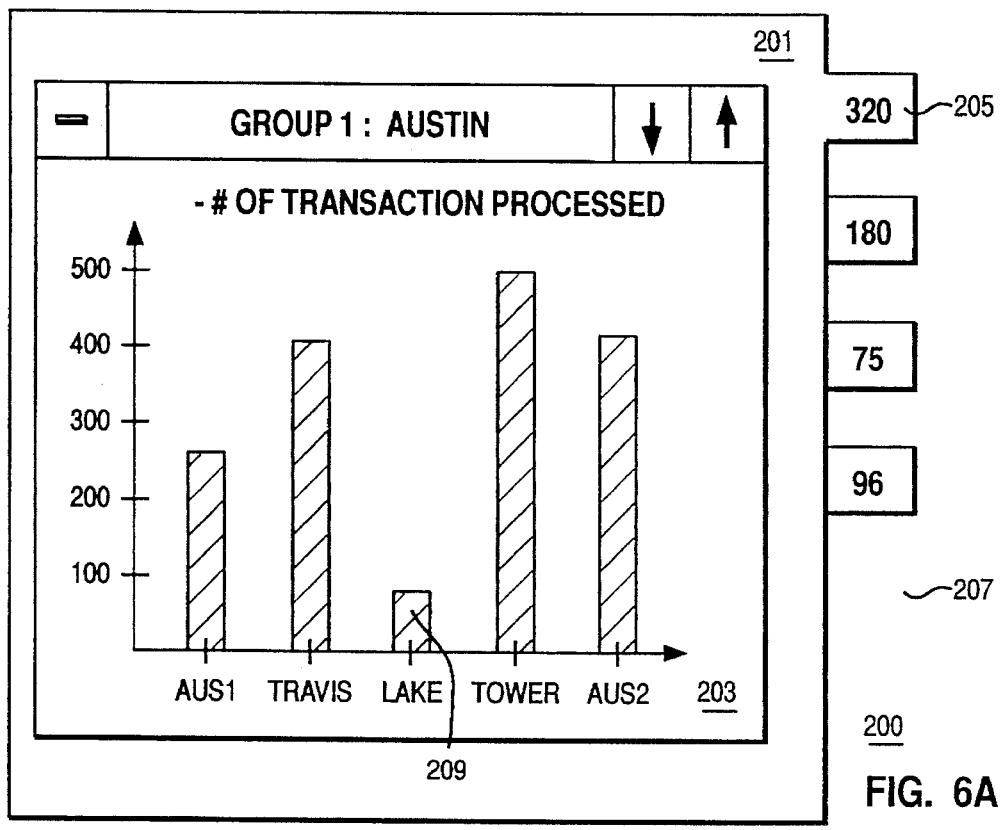
FIGS. 6A and 6B illustrate a change in the status of a group on the top page of the network, wherein the symbol on the tab is also changed.
Figure 6B:
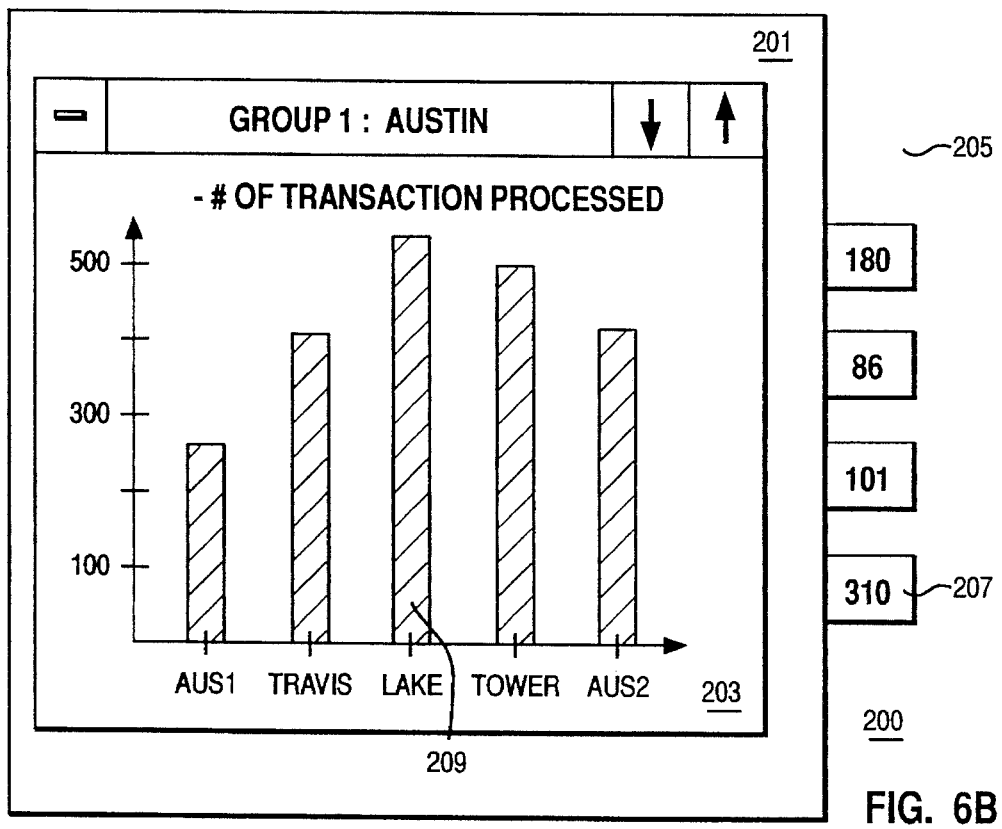

FIGS. 6A and 6B, presented a change in the status of the group of nodes illustrated in the top page of a notebook necessitating a change in the symbol displayed in its corresponding tab. In this example, the grouping criteria is by geographic location. The top page 201 of the notebook 200, shows nodes located in Austin, the window depicts the number of transaction processed at each of the nodes. The tab 205, shows an average number of transactions processed and because it is in acceptable limits, it is displayed in a normal manner. On the other hand another tab 207, is displayed in flashing reverse video as the number of transactions have passed some critical limit which may call for the administrator's attention. Alternatively, colors such as green for acceptable, yellow for borderline and red for critical may be used in the tabs.

As shown in FIG. 6B, in the past hour, the numbers of transactions processed by node Lake, as shown by the line bar 209, has jumped from a little under 100 transactions/sec. to 550 transactions/sec. This causes the tab 205 associated with this page to change to flashing reverse video indicating possible need for administrator attention. Meanwhile, the second tab 207 is now displayed normally indicating that the number of transactions has decreased to acceptable levels in the group associated with the hidden page.

Figure 7:
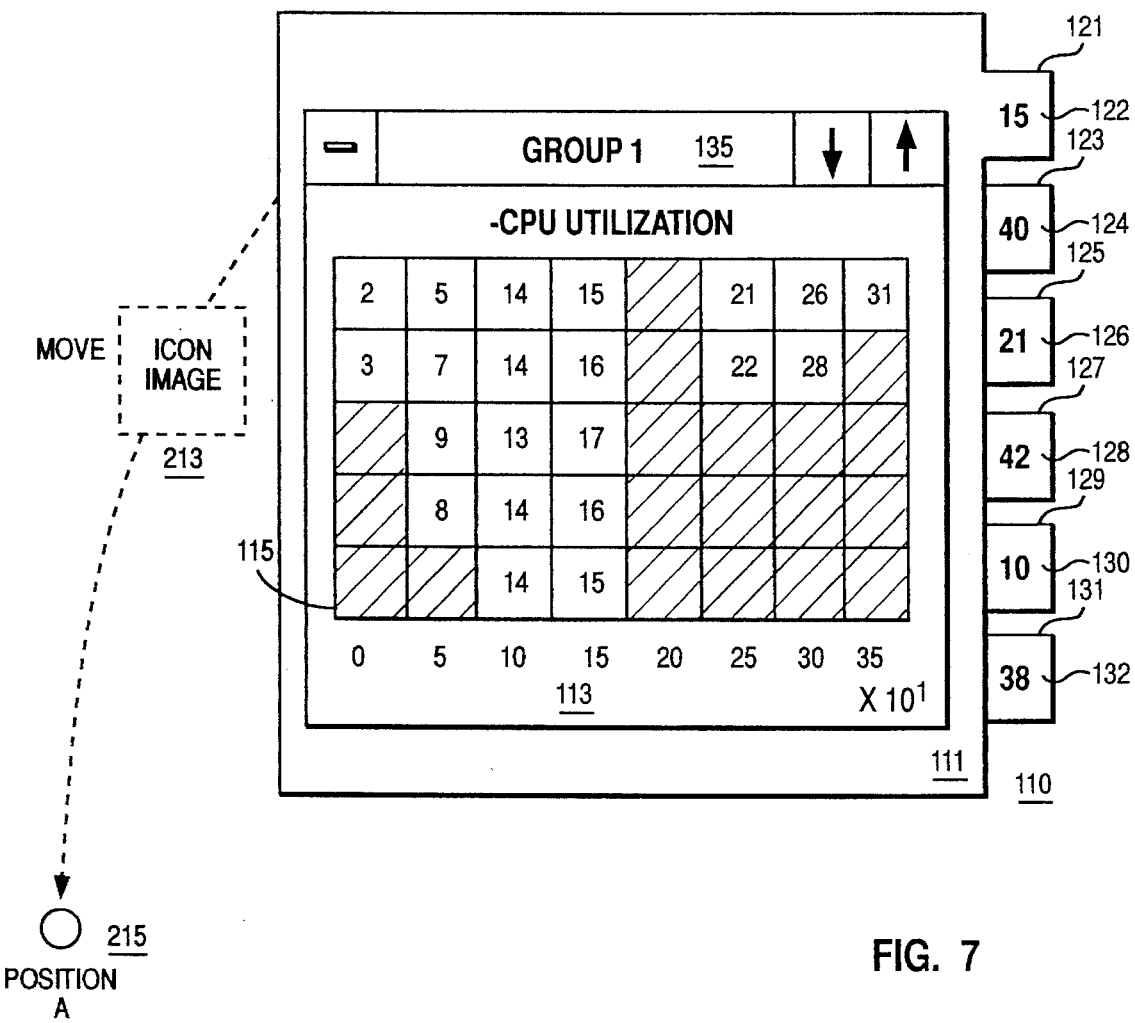
FIG. 7 illustrates creating a child window outside the notebook by a drag and a drop operation.
Figure 7:
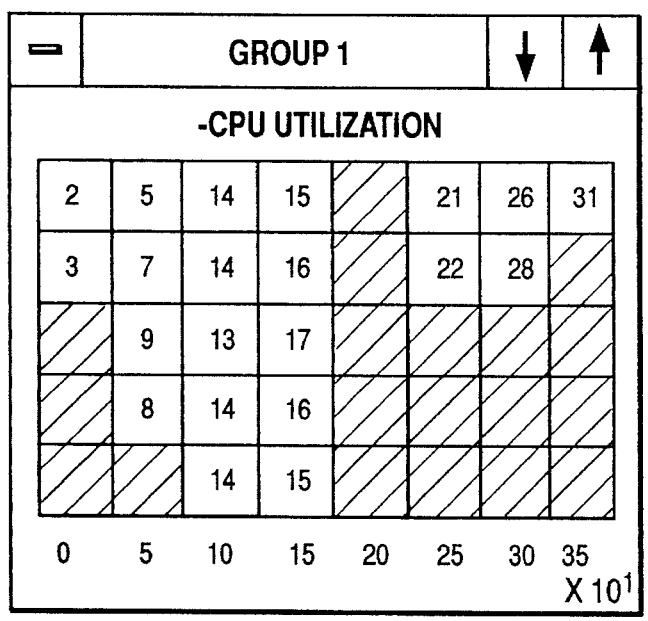

It is an additional feature of the notebook of the present invention that a child window can be created of a notebook page outside the notebook, so that two pages can be compared simultaneously. In FIG. 7, a child window 211 of the top page 111 of the notebook 110 depicted in FIG. 4 has been created. This may be done by performing a drag and drop operation. The user might bring the mouse pointer down on the title bar 135, depress and hold a mouse button and "drag" an iconized representation of the window to a second position. The mouse button is released at a second position 215. Upon the release of the mouse button, the new child window 211 is created.

Figure 8:
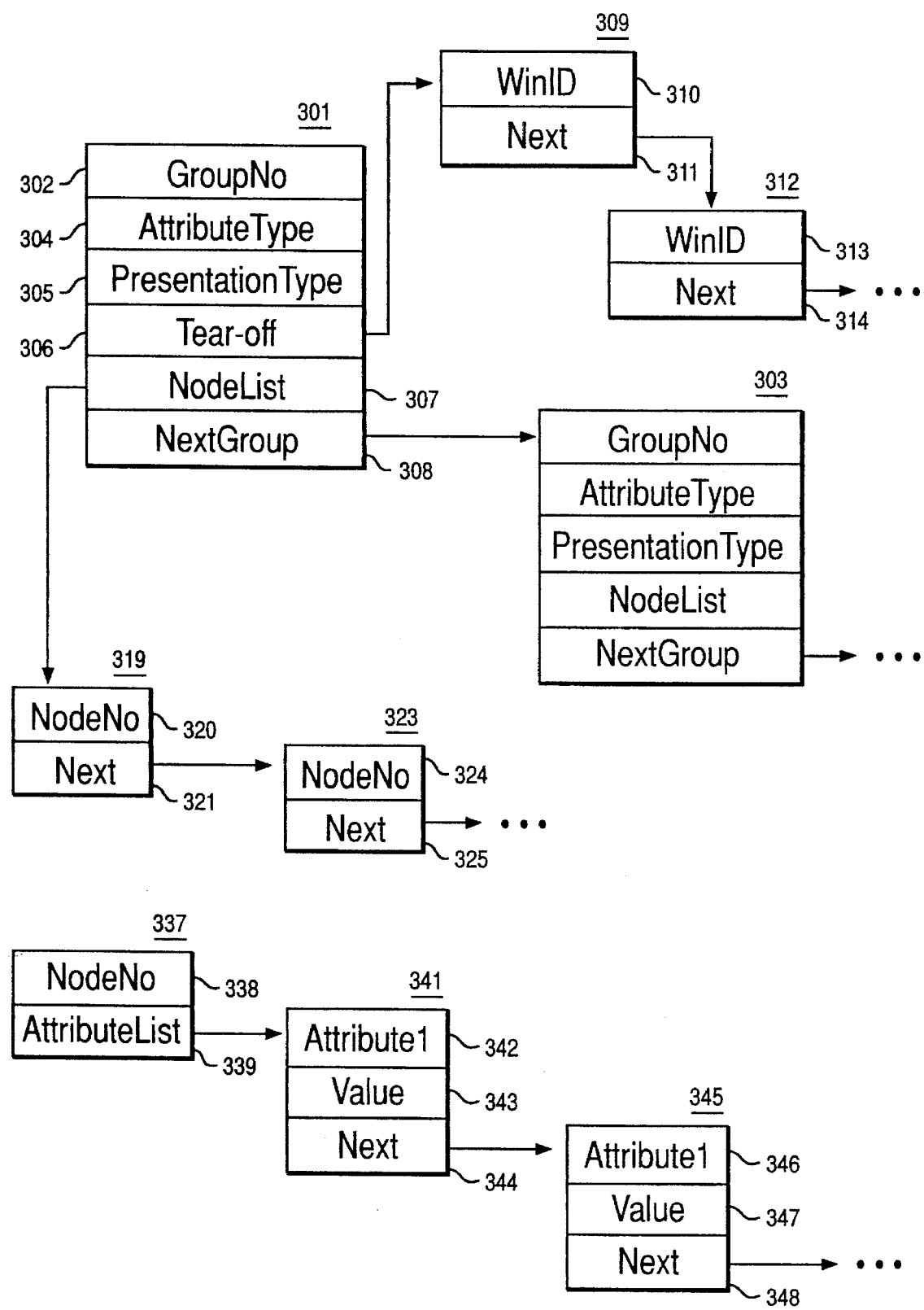
FIG. 8 illustrates one possible data structure of the notebook according to the present invention.

One possible data structure for the GUI which would be stored in the random access memory is shown in FIG. 8. The DLL data structure in FIG. 8 depicts the foundation for the design of this invention. The DLLs built for this invention will be used together with the notebook DLLs in generating the notebook GUI, in this example, for a status monitor program. The status monitor program will use the notebook DLLs for creating a notebook, including the needed controls, e.g., tabs, scroll bar, and use this invention's DLLs for dynamically changing the tabs, creating a separate window of a selected page, and the other features of the present invention. Those skilled in the art would recognize that other data structures could be used. The data structure 300 includes a plurality of data structures 301, 303, one for each of the pages in the notebook. Each page data structure 301, 303 includes fields for information such as group number 302, attribute type 304, presentation type 305, tear-off windows 305, if any, node list 307, and a pointer, the next group 308. The attribute type describes the types of attributes to be included in the presentation for this group. Examples of attribute types might include the number of connections, the workload in transactions per second, the total ingoing and outgoing traffic count or the connectivity with another node, based on the traffic counts between the two nodes. The presentation type 305, describes the type of presentation such as matrix, graphic display, test, animation, icons, and so forth, which should be presented if this group is the top page in the notebook.

The tear-off field 306 is a pointer to the first window file 309, if any, which may be a child window of the notebook. At a minimum, the child window data structure 309 would contain a window id field 310 and a pointer 311 to the next child window data field 312, if any. The pointer 311 would be set to zero if there were no more child windows.

The node list 307, is a list of all the nodes in this page and also is a pointer to the first node data structure 319. The node data structure 309 contains information such as the node number 320 and a pointer 321 to the next node data structure 323. Likewise, in the next data structure 323 contain a node number field 324 and a pointer to the next node in the node list 325, if it is the last node in the list, the pointer in the next field 325 would be set to zero.

The attribute list would be composed of items such as connectivity, traffic count and workload as discussed before. The node number is also associated with an attribute data structure 337 which contains information on the attribute list 339. The attribute list 339 is composed of a plurality of data structures 341, 345, which contain fields for the attribute 342, 346, the value of the attribute 343, 347 and pointers to the next attribute in the list 344, 348.

Figure 9:
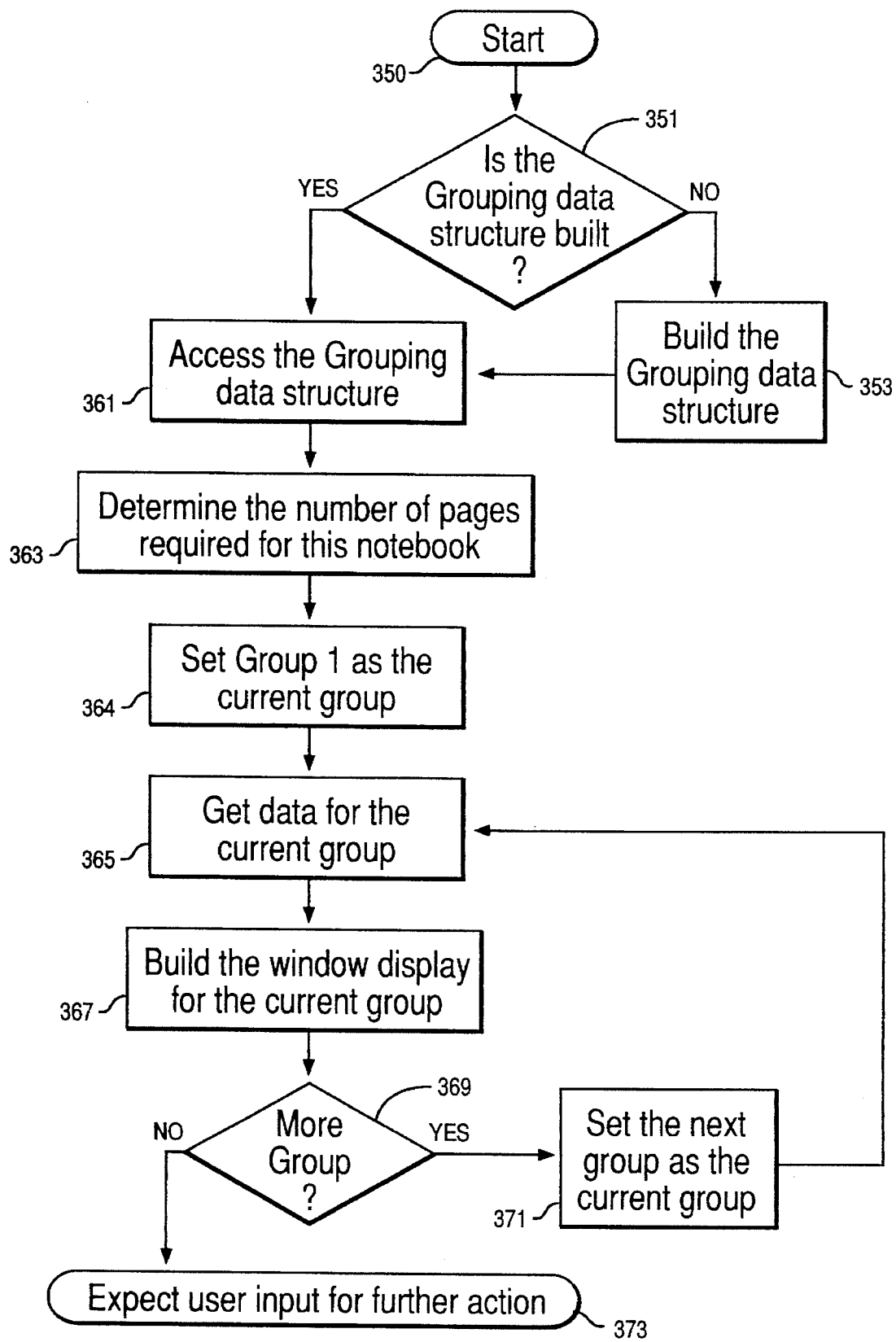
FIG. 9 is a flow diagram of the process to build the notebook.

The flow diagram of how the graphical user interface is initialized is depicted in FIG. 9. The process starts, step 350, and proceeds to step 351 where a test is performed to determine whether the grouping data structure shown in FIG. 8 is built. If not, in step 353, the grouping data structure is built. The grouping data structure is built according to the attributes by which the nodes will be grouped. For example, the nodes may be grouped on the basis of traffic count. The designer of the status monitor will decide what the maximum number of nodes which will be allowed in a group for ease of presentation. The current traffic count for each node will be calculated and the nodes with the highest traffic count would be placed in the highest group and so forth until all of the nodes are assigned to a group.

If the grouping data structure is build, in step 361, this data structure is accessed for future processing. In step 363, the number of pages required for a notebook presentation is determined based on the number of groups in the data structure. In step 364, Group 1 is set as the current group. The data for group 1 is retrieved in step 365, which will be necessary for presentation based on this specified attribute type and presentation type. In step 367, the window display for the current group, group 1, is built. A test performed in step 369 determines whether there are any more groups for which to build a window display. If there are more groups, in step 371, the next group is set as the current group and the process returns to step 365, where the process waits for user input for further action.

Figure 10:
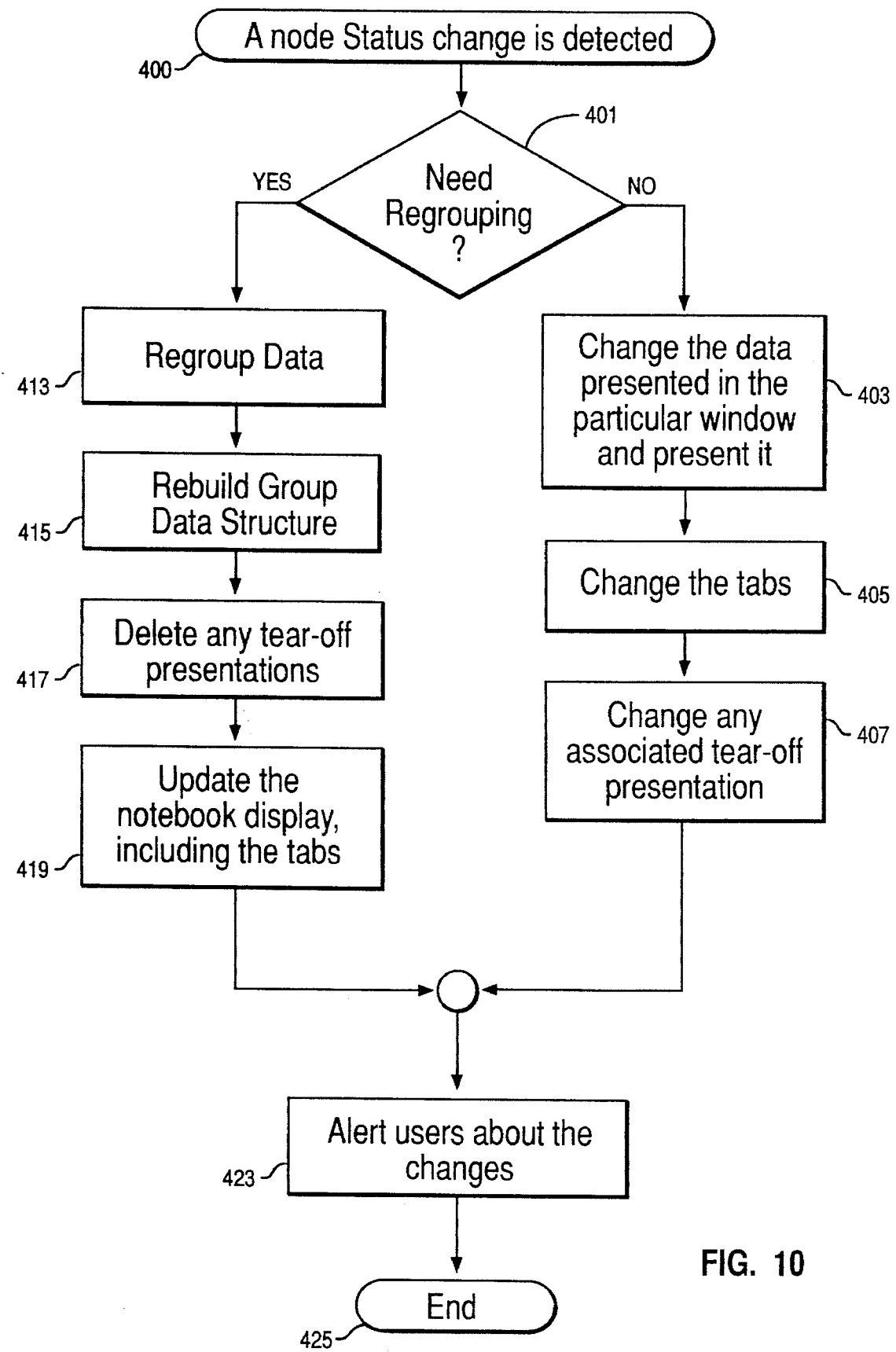
FIG. 10 is a flow diagram when a change in node is detected.

When the status of the dynamic data changes, e.g., state of some of the nodes, the process depicted in FIG. 10 is followed. In step 400, the node status change is detected. A test is performed in step 401, to determine whether the status change necessitates regrouping of a data. If not, the data presented in the top window or top page is changed and the display refreshed. If not, in step 405, the tabs are changed to reflect the change in the dynamic data. This may be accomplished by referring to data which describes how the tabs are to be displayed given a particular range of dynamic data. Next, the step 407, the child windows are also changed according to the presentation data to reflect the new dynamic data.

If the change in state necessitates a regrouping of the dynamic data, in step 413, the data is regrouped. In step 415, the group data structure is rebuilt according to the regrouped dynamic data and the changes in state of the dynamic data. Next, in step 417, any child windows are deleted. This assumes that due to the regrouping, the user would be interested in different pages within the notebook. In step 419, the ntotebook display, i.e. the top page and tabs are changed to reflect the regrouped data. The users can be alerted in step 423 about the changes by such means as an audio signal such as a beep or a pop-up message box.

Figure 11:
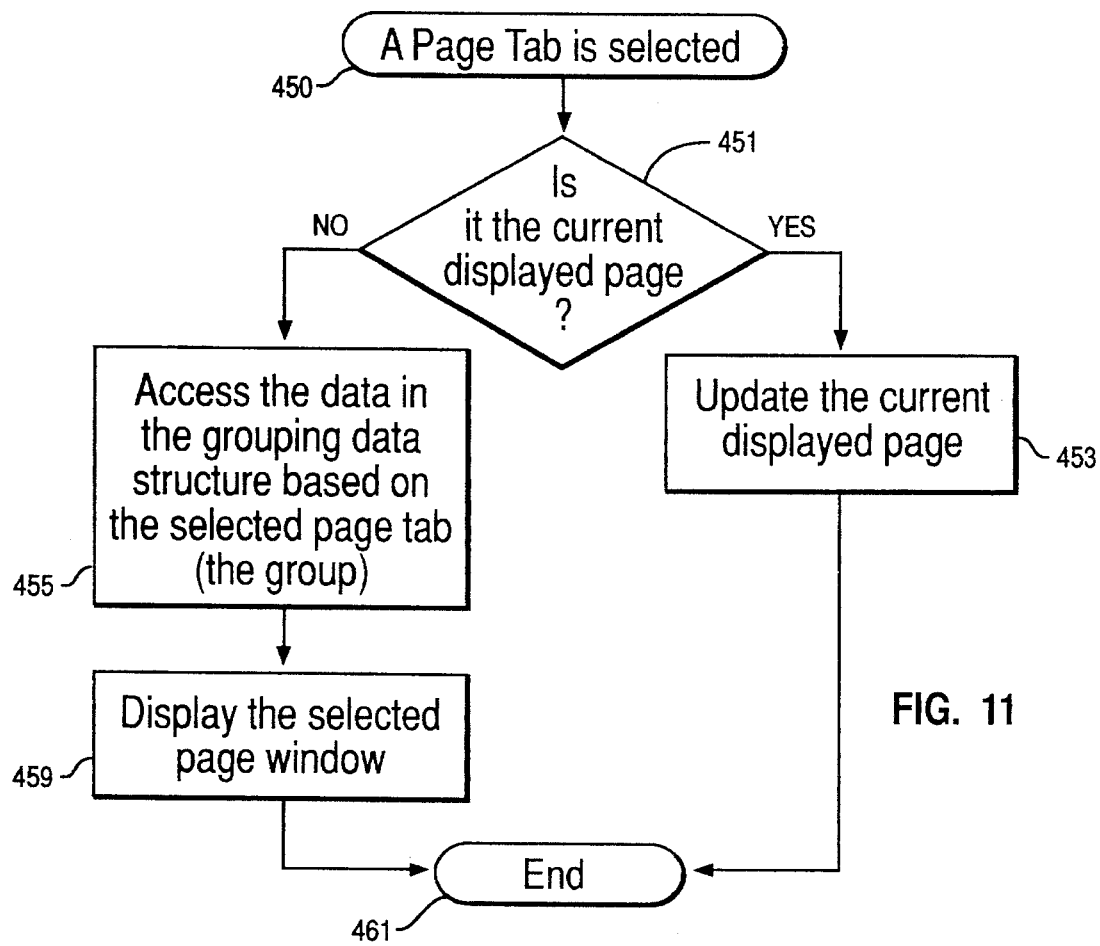
FIG. 11 depicts the process of selecting a page tab.

One of the features of a notebook is that a user can rapidly change from page to page by selecting the tab associated with that page. This process is illustrated in FIG. 11. In step 450, a page tab is selected. A test is performed in step 451 to determine the selected tab is associated with the whether currently displayed page. If so, in step 453, the currently displayed page is updated with the new attribute values. If the page tab selected is not associated with the currently displayed page, in step 455, the data in the grouping data structure associated with the selected tab is retrieved. In step 459, this group of dynamic data is then displayed on top of the notebook according to attribute type and presentation type. The process ends in step 461.

Another feature of the invention is that unlike a tradition notebook control, a window can be selected from within the notebook, dragged and dropped, thus copying the window or creating a child window outside the notebook. This is useful if the user needs to view multiple windows simultaneously to compare the state of different groups of the dynamic data, e.g., different groups of nodes in the network. After this drag-drop operation, the original window still exits in the notebook.

Figure 12A:
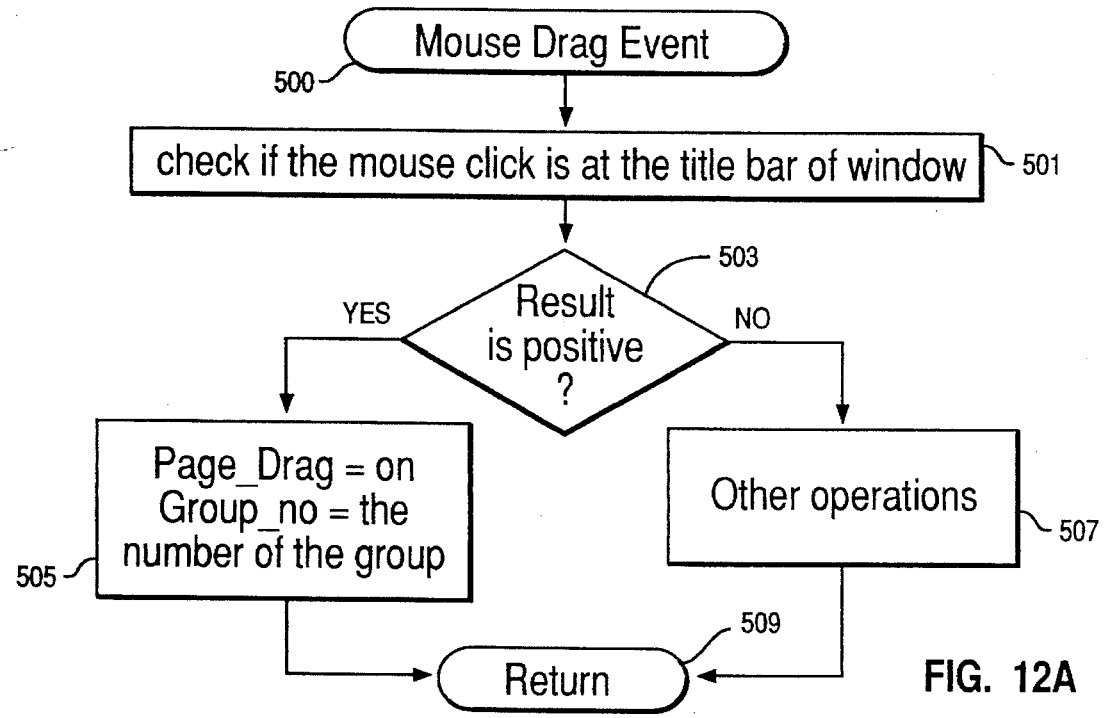
FIGS. 12A–12C depict the process for creating a child window outside the notebook.
Figure 12B:
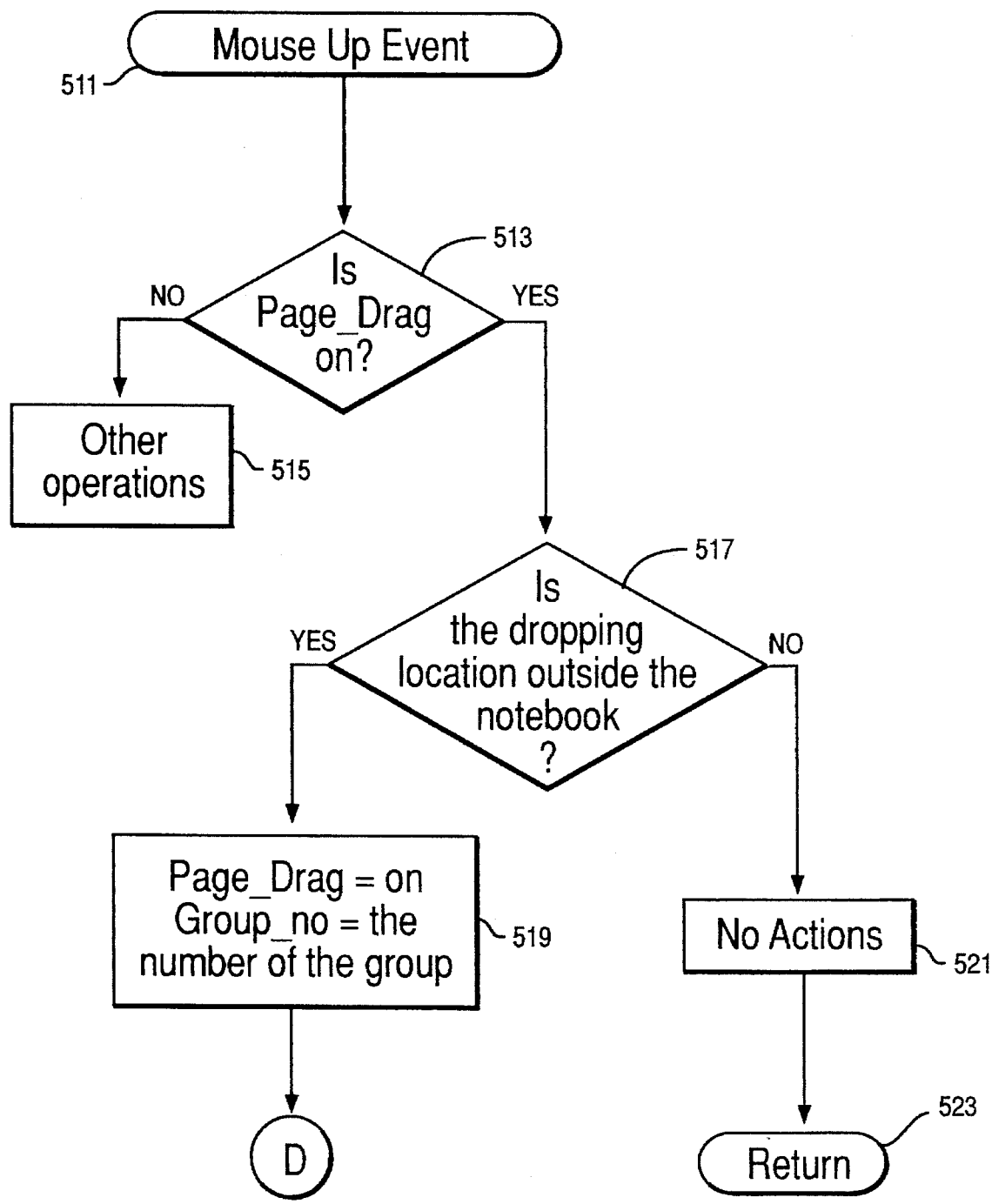
Figure 12C:
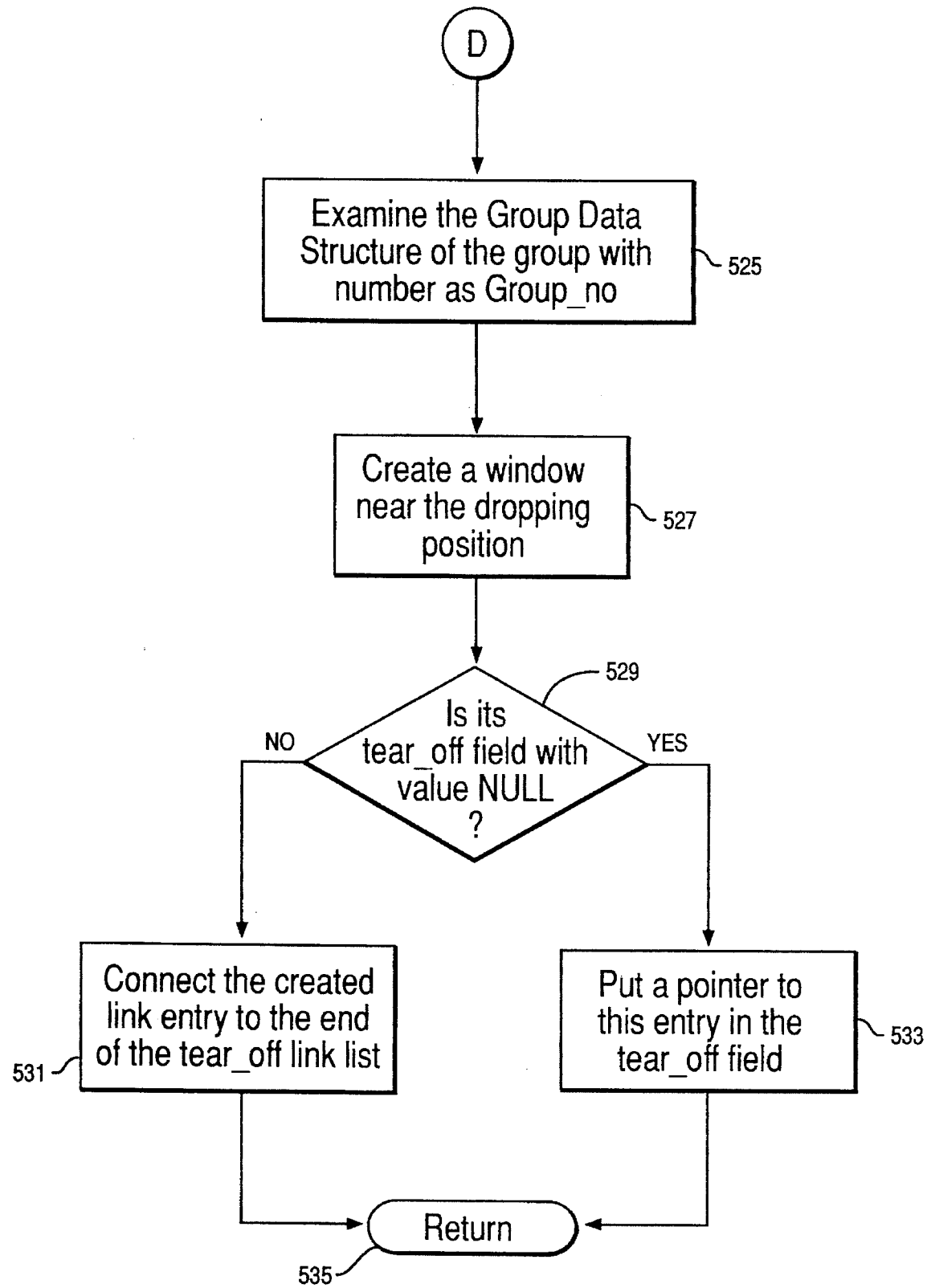

The creation of a child window outside the notebook is depicted in FIGS. 12A–12C. Starting in step 500, a mouse drag event is detected by the system. In step 501, a check is performed to determine whether the mouse click, which initiated a mouse drag event, is at the title bar of the displayed page or an icon representing the page. If the result of this check is determined to be positive, in step 503, the Page_Drag variable is set to "on" and the Group_no variable is set to the number of the group presented in the dragged window, step 505. If the mouse click was not at the title bar or icon of the page in step 507 of the operations as appropriate are performed by the system in step 509, the system returns monitor for events.

In step 511 of FIG. 12B, a mouse up-event is detected. In step 513, the Page_Drag variable is checked, if it is not "on" in step 515 other operations take place. However, if the Page_Drag variable is on, in step 517, a test is performed to determine whether the dropping location is outside the notebook. If the dropping location is not outside the notebook in step 521, no actions take place and the process returns to monitor for other events, step 523.

However, if the dropping location is outside the notebook, in step 525 in FIG. 12C, the group data structure of the group with the number whose page has been dragged outside the window, is examined. In step 527, a window is created near the dropping position. This entails creating a window id for the created window and an entry for the tear-off link list based on the window id. In step 529, a test is performed to determine whether its tear-off field has the value of null, if not the created link entry is connected to the end of the tear-off link list, step 531. If the tear-off field is null in step 533, a pointer to this entry is placed in the tear-off field. The process returns, step 535.

Figure 13:
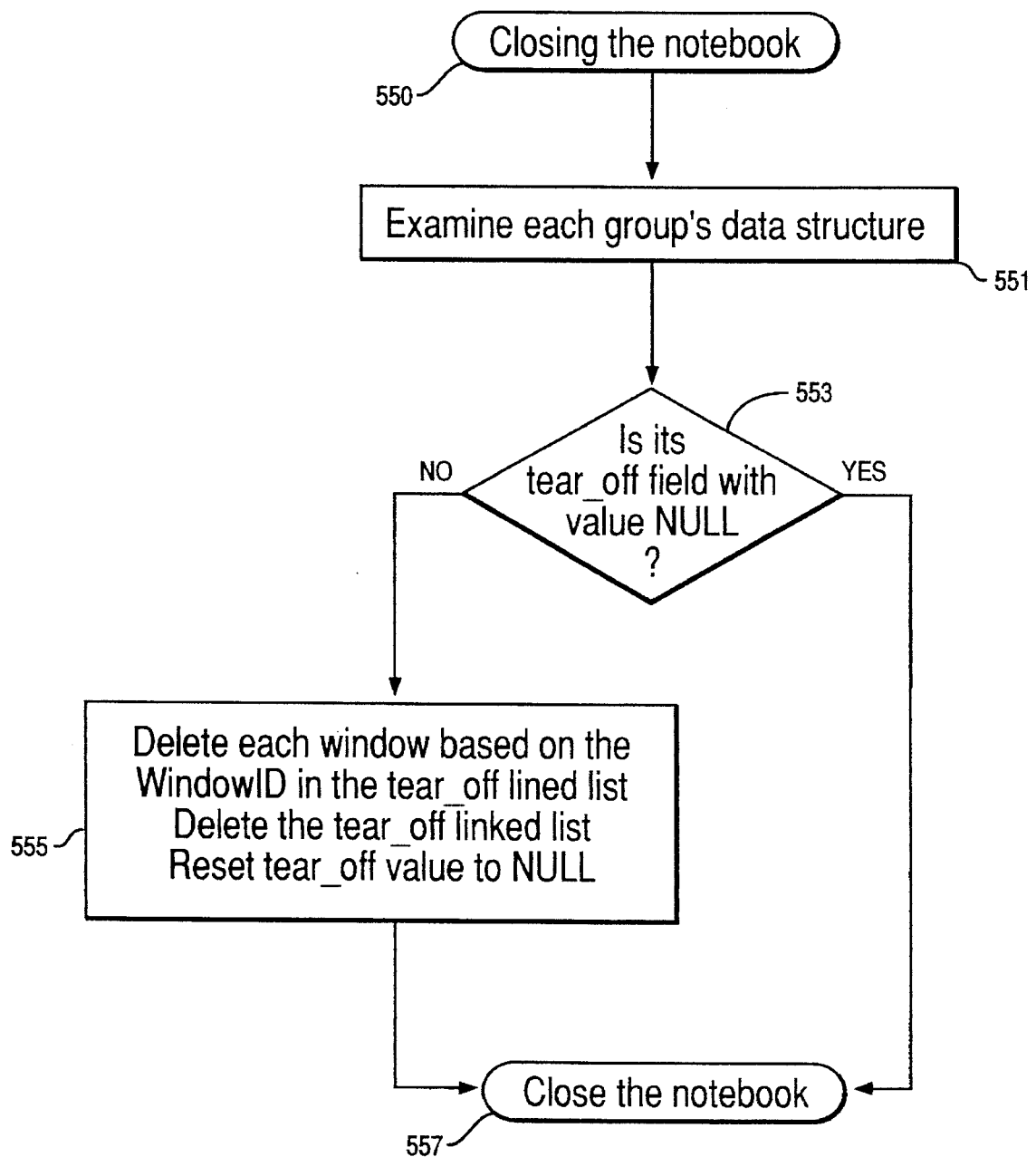
FIG. 13 depicts the process for closing the notebook.

As the newly created window outside the notebook is defined as a child window of a notebook, closing the notebook will also close all such child windows automatically. In the invention's notebook interface, a notebook allows its pages to be copied and the duplicated windows are still managed by the notebook. In FIG. 13, the process for closing the notebook is depicted. In step 550, the process for closing the notebook is initialized by selection of a close icon in a system icon menu or a "quit" action in a file pull-down menu from the action bar. In step 551, each group's data structure is examined to determine whether there are any child windows associated with the notebook. If so, they will be deleted so they do not automatically reappear when the notebook is reopened. In step 553, a test is performed to determine whether the tear-off field is set with the value of a "null". If not, in step 555, each child windows created from the notebook is deleted based on the window id in the tear-off list from the group data structure. The tear-off link list is deleted and the tear-off value is reset to "null". Finally, in step 557, the notebook itself is closed.

The notebook interface is suitable for organizing any set of dynamic data. As shown in the embodiments above, while the invention can be used to present groups of any kind of dynamic data, it is particularly suitable for organizing the status data of a massive node server system or the like. The status monitor presents status data in a group level. According to the user specified clustering rules, nodes are clustered into groups. The status data of the nodes in a group are presented in a window, according to the presentation type and attribute type of that group. The windows are organized in the notebook interface each window taking a page. By using different colors or shapes, the tab of each page can indicate the aggregated status of the nodes in a group. For example, a tab with red color may indicate a substantial portion of the nodes are in a critical situation. Based on the information shown by the tabs, the user can decide which page to select. Also, as all tabs in the notebook appear on the screen together, this provides an easy means to compare status among the groups. Based on the information revealed by the tab, a page can be selected for investigation. Thus, the tabs provide a group based status summary and also allow the user to review any particular group as needed for further information.

While the invention has been described with respect to particular embodiments above it would be understood by those skilled in the art that modifications may be made without departing from the spirit and scope of the present invention. These embodiments are for purposes of example and illustration only and are not to be taken to limit the scope of the invention narrower than the scope of the appended claims. The invention is intended to be limited only as defined in the claims.

We claim:

1. A method for presenting dynamic data on a display, comprising the steps of:

displaying the dynamic data as a plurality of groups, each group assigned to a page in a notebook;

detecting a change in the dynamic data;

regrouping the dynamic data in response to the change in the dynamic data so that at least a first element of the dynamic data is assigned to a different page than before regrouping; and displaying the notebook with the regrouped dynamic data.

2. The method as recited in claim 1, further comprising the step of displaying a top page of the notebook according to an attribute type which specifies which dynamic data, of the dynamic data associated with the top page is to be displayed on the top page.

3. The method as recited in claim 1 further comprising the step of displaying a top page of the notebook with a new group of dynamic data containing the first element.

4. The method as recited in claim 1 wherein the detecting step comprises monitoring the status of nodes in a network and the dynamic data of each page represents a group of nodes in a computer system.

5. A method of presenting data on a display, comprising the steps of:

displaying the data as a plurality of groups, each group assigned to a page in a notebook, a top page having a window begin displayed on top of the notebook; and creating and displaying a child window by copying the window outside the notebook so that the child window and the notebook are concurrently displayed.

6. The method as recited in claim 5 wherein the child window is created by means of a drag and drop operation.

7. The method as recited in claim 5 which further comprises the steps of:

closing the notebook in response to a user command; and automatically closing the child window in response to closing the notebook.

8. A method for presenting dynamic data on a display, the dynamic data grouped in a plurality of groups each group assigned to a page in a notebook, each page having a tab, the method comprising the steps of:

determining a state for each group of dynamic data;

selecting a tab icon according to the state of group of dynamic data; and displaying the notebook and the tab of each page according to the state of the group assigned to that page.

9. The method as recited in claim 8, which further comprises the steps of:

detecting a change in state for at least a first group of dynamic data; and changing the tab icon according to the change of state, the tab corresponding to the first group of dynamic data.

10. The method as recited in claim 8 wherein the dynamic data of each page represents a group of nodes in a computer system.

11. The method as recited in claim 9, which further comprises the step of:

regrouping the dynamic data in response to the change in state so that at least a first element of the dynamic data is assigned to a different page than before regrouping; and displaying the notebook with the regrouped dynamic data.

12. The method as recited in claim 11 further comprising the step of displaying a top page of the notebook with a new group of dynamic data including the first element.

13. A system for presenting dynamic data on a display, comprising:
   means for displaying the dynamic data as a plurality of groups, each group assigned to a page in a notebook;
   means for detecting a change in the dynamic data;
   means for regrouping the dynamic data in response to the change in the dynamic data so that at least a first element of the dynamic data is assigned to a different page than before regrouping; and
   means for displaying the notebook with the regrouped dynamic data.

14. The system as recited in claim 13, further comprising means for displaying a top page of the notebook according to a presentation type which specifies the manner in which the dynamic data is to be displayed on the top page.

15. The system as recited in claim 13 further comprising means for displaying a top page of the notebook with a new group of dynamic data including the first element.

16. The system as recited in claim 13 wherein the detecting step comprises monitoring the status of nodes in a network and the dynamic data of each page represents a group of nodes in a computer system.

17. A system of presenting data on a display, comprising:
   means for displaying the data as a plurality of groups, each group assigned to a page in a notebook, a top page having a window being displayed on top of the notebook;
   means for creating a child window by copying the window outside the notebook;
   means for displaying a child window and the notebook concurrently.

18. The system as recited in claim 17 wherein the child window is created by means of a drag and drop operation.

19. The system as recited in claim 17 which further comprises the steps of:
   means for closing the notebook in response to a user command; and
   means for automatically closing the child window in response to closing the notebook.

20. A system for presenting dynamic data on a display, the dynamic data grouped in a plurality of groups each group assigned to a page in a notebook, each page having a tab, the method comprising:
   means for determining a state for each group of dynamic data;
   selecting a tab icon according to the state of group of dynamic data; and
   means for displaying the tab of each page according the state of the group assigned to that page.

21. The system as recited in claim 20, which further comprises:
   means for detecting a change in state for at least a first group of dynamic data; and
   means for changing the a tab icon according to the change of state, the tab corresponding to the first group of dynamic data.

22. The system as recited in claim 21, which further comprises:
   means for regrouping the dynamic data in response to the change in state so that at least a first element of the dynamic data is assigned to a different page than before regrouping; and
   means for displaying the notebook with the regrouped dynamic data.

23. A computer program product in a computer readable memory for presenting dynamic data on a display, comprising:
   means for displaying the dynamic data as a plurality of groups, each group assigned to a page in a notebook;
   means for detecting a change in the dynamic data;
   means for regrouping the dynamic data in response to the change in the dynamic data so that at least a first element of the dynamic data is assigned to a different page than before regrouping; and
   means for displaying the notebook with the regrouped dynamic data.

24. The product as recited in claim 23 further comprising:
   means for displaying a top page of the notebook with a new group of dynamic data including the first element.

25. A computer program product in a computer readable memory for presenting data on a display, comprising:
   means for displaying the data as a plurality of groups, each group assigned to a page in a notebook, a top page having a window being displayed on top of the notebook; and
   means for creating and displaying a child window by copying the window outside the notebook so that the child window and the notebook are concurrently displayed.

26. The product as recited in claim 25 which further comprises:
   means for closing the notebook in response to a user command; and
   means for automatically closing the child window in response to closing the notebook.

27. A computer program product for presenting dynamic data on a display, the dynamic data grouped in a plurality of groups each group assigned to a page in a notebook, each page having a tab, the method comprising the steps of:
   means for determining a state for each group of dynamic data; and
   selecting a tab icon according to the state of group of dynamic data; and
   means for displaying the notebook and the tab icon of each page according the state of the group assigned to that page.

28. The product as recited in claim 27, which further comprises:
   means for detecting a change in state for at least a first group of dynamic data; and
   means for changing the tab icon according to the change of state, the tab corresponding to the first group of dynamic data.

29. The product as recited in claim 28, which further comprises:
   means for regrouping the dynamic data in response to the change in state so that at least a first element of the dynamic data is assigned to a different page than before regrouping; and
   means for displaying the notebook with the regrouped dynamic data.

* * * * *

UNITED STATES PATENT AND TRADEMARK OFFICE
CERTIFICATE OF CORRECTION

PATENT NO : 5,542,040
DATED : July 30, 1996
INVENTOR(S) : Chang et al

It is certified that error appears in the above-identified patent and that said Letters Patent is hereby corrected as shown below:

Column 1, line 52, please delete "the" and insert --The--;

Column 8, line 1, please delete "build" and insert --built--;
Column 10, line 32, please delete "begin" and insert --being--;

Signed and Sealed this

Third Day of August, 1999

Attest:

Q. TODD DICKINSON

*Attesting Officer*     *Acting Commissioner of Patents and Trademarks*